United States Patent [19]

West

[11] 4,218,192
[45] Aug. 19, 1980

[54] PRESSURE SOURCE

[76] Inventor: William S. West, 939 W. Arcadia Ave., Arcadia, Calif. 91006

[21] Appl. No.: 781,852

[22] Filed: Mar. 28, 1977

[51] Int. Cl.² .................................................. F04B 17/00
[52] U.S. Cl. ........................................ 417/333; 417/337; 60/496; 60/505
[58] Field of Search .............. 417/331, 332, 333, 337; 60/496, 495, 498, 504, 505; 290/42, 53; 137/433

[56] References Cited

U.S. PATENT DOCUMENTS

| | | | |
|---|---|---|---|
| 610,013 | 8/1898 | Armstrong et al. | 417/333 |
| 632,826 | 9/1899 | Rice | 417/333 |
| 975,157 | 11/1910 | Quedens | 60/497 X |
| 1,665,140 | 4/1928 | Master | 417/331 |
| 3,126,830 | 3/1964 | Dilliner | 417/331 |
| 3,633,610 | 1/1972 | Hellqvist | 137/433 X |

FOREIGN PATENT DOCUMENTS 367127  2/1932  United Kingdom ............... 60/497

*Primary Examiner*—Richard E. Gluck
*Attorney, Agent, or Firm*—Donald D. Mon

[57] ABSTRACT

A pressure source to develop a stream of liquid under pressure as a consequence of the rise and fall of the surface of a body of water. The pressurizing means comprises an enclosure which bounds a chamber having a pair of portions at least one of which is movable relative to the other as a consequence of a force applied to one of them to reduce the volume of a chamber and thereby to place under pressure liquid which is contained therein. A conduit leads from the chamber through which a stream of liquid under pressure can flow for doing work. Buoyant means is floatable in the body of water to rise with its surface and to lower when the surface is sufficiently below the weight means. Force transmission means applies force from the weight means, when elevated, to the one portion. A release valve is located in said conduit, which when closed prevents flow of liquid through the conduit and thereby prevents the weight means from lowering, and which when open permits flow of liquid through the conduit and thereby permits the weight means to lower. Control means is effective selectively to close and to open the release valve as a function of whether the water surface is as high as or higher than a reference level relative to the weight means itself and opening the release valve means when lower.

1 Claim, 7 Drawing Figures

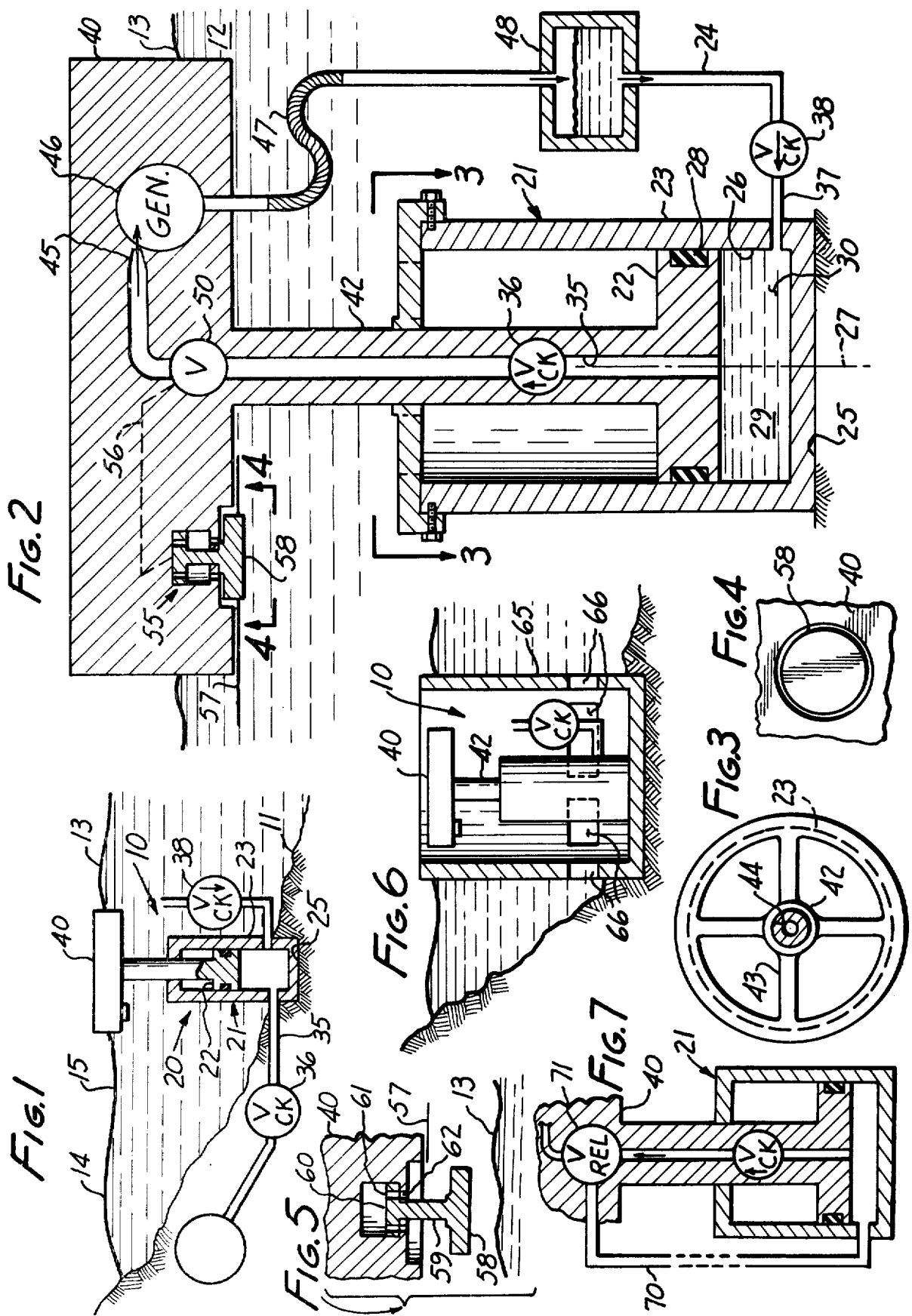

PRESSURE SOURCE

This application relates to a pressure source.

A pressure source for generating a stream of liquid under pressure for doing work as a consequence of the rise and fall of the surface of a body of water is shown in West U.S. Pat. No. 3,961,480 issued June 8, 1976. One embodiment of the West patent includes a buoyant weight means which rises and falls with the surface of a body of water, and which includes a valve in the conduit from its pressurizing means which is opened when the water level reaches a predetermined elevation. The purpose of this arrangement is to enable the weight means to descend without buoyant support by the water while it is descending, whereby it will exert its maximum weight on the pressurizing means. This has the additional advantage of maintaining a substantially constant pressure in the pressurizing means.

The said West device functions well, and is especially well-suited for environments where the rise and fall of the surface is relatively regular and cyclical relative to a specific elevation. There are, however, situations in which the rise and fall may be relatively irregular or erratic, and in which the elevation might vary, such as with the tide.

It is an object of this invention to provide means which will permit the weight means to lower under substantially the same circumstances in the West situation, i.e. when the weight means is unsupported by the water but wherein the rise and fall might be relatively irregular or interrupted, or related to random elevations.

A pressure source according to this invention includes pressurizing means which includes an enclosure that bounds a chamber. The enclosure comprises a pair of portions, at least one of which is movable relative to the other as a consequence of the force applied to it so as to reduce the volume of the chamber, and thereby place under pressure liquid which is contained therein. A conduit leads from the chamber through which a stream of liquid under pressure can flow for doing work. Buoyant means is floatable in the body of water to rise with its surface and to lower when the surface is sufficiently far below the weight means. Force transmission means is so disposed and arranged so as to apply force from the weight means when elevated to the one portion. A release valve is placed in the conduit which when closed prevents flow of liquid through the conduit and thereby prevents the weight means from lowering. When open it permits flow of liquid through the conduit and thereby permits the weight to lower. Control means is effective selectively to close and to open the release valve, the control means closing the release valve when the water surface is as high as or higher than a reference level relative to the weight means and closes the release valve means when it is lower.

According to a preferred but optional feature of the invention, the control means comprises a buoyant float carried by the weight means in such manner that within limits it is independently movable up and down as a function of the location of the water surface relative to the reference level.

The above and other features of this invention will be fully understood from the following detailed description and the accompanying drawings, in which:

FIG. 1 is a side elevation partly in axially cutaway cross section and partly in schematic notation showing the presently preferred embodiment of the invention;

FIG. 2 is an enlargement of a portion of FIG. 1 with some additional features shown therein;

FIGS. 3 and 4 are sections taken at line 3—3 and 4—4 of FIG. 2;

FIG. 5 shows a portion of FIG. 2 in another operating position;

FIG. 6 shows the device of FIG. 1 with a further modification; and

FIG. 7 is a fragmentary axial cross section showing a portion of another embodiment of the invention.

FIG. 1 shows the presently preferred embodiment and best known mode of the invention. A pressure source 10 is shown established on the bottom 11 beneath a body 12 of water having a surface 13 which can rise and fall such as by wave motion. A typical example is near the shoreline where the waves have not yet broken but have a substantial elevation between crest 14 and trough 15.

The pressure source includes a pressurizing means 20 including an enclosure 21 having a first portion 22 and a second portion 23. The second portion comprises a cylinder 24 which is firmly mounted to a foundation 25 on the bottom. It includes a circularly cylindrical wall 26 having a vertical axis 27. The second portion is a piston having a peripheral seal 28 which makes a sliding fluid sealing fit with wall 26. This forms an enclosure 29. The first portion 22 is movable relative to the second portion as a consequence of a downward vertical force applied to it which tends to reduce the volume of the chamber 29 and thereby to place under pressure liquid 30 which is contained therein. A conduit 35 (FIG. 2) leads from the chamber through which a stream of liquid under pressure can flow for doing work. A unidirectional check valve 36 is disposed in the conduit which permits liquid to flow out of the chamber but not into it. An inlet port and conduit 37 includes an inlet check valve 38 which permits flow of liquid into the chamber but not out of it. If desired the inlet port and conduit may receive liquid directly from the body of water or it may be a recirculating system containing a different liquid, as further described below.

Buoyant weight means 40 is floatable on the surface 13 of the body of water so as to raise and lower with that surface. This buoyant weight means may be as simple as a floating log or it may be an assembly such as a boat, scow, or tank, depending on the specific gravity and the weight and bulk desired. As best shown in FIG. 2 it comprises a substantial body which is connected to the first portion by a transmission means 42. The transmission means in this embodiment comprising a vertical member in the nature of a cylindrical shaft which is side-supported by a spider 43 ("side support means") attached to the top of the second portion. It is slidable in an aperture 44 formed by the spider. Accordingly water can flood the part of the second portion above the first portion in the pressurizing means. The conduit may either be formed separately such as by a flexible hose as shown in FIG. 1 and taken ashore or to any other desired location for doing its work, or as in the presently preferred embodiment it may pass upwardly through the transmission member to a nozzle 45 which emits the water as a high pressure stream to a shaft drive 46 which may form part of a generator for generating electricity. Any suitable user device can be supplied which can use a pressurized stream of liquid as power.

Exhaust liquid 47 may either be returned to the body of water, or if preferred liquid separate from that of the body of water, such as fresh water in the system instead of salt water from the body of water, may be returned to a reservoir 48 through an exhaust line 49 from which the inlet port of conduit can draw liquid for subsequent operation.

A release valve 50 is placed in the conduit. This is an off/on valve. When the release valve is closed it prevents flow of liquid through the conduit and by preventing exit of liquid from the chamber prevents the weight means from lowering even when not supported by the body of water. When the release valve is opened, it permits flow of liquid through the conduit and thereby permits the weight means to lower. Control means 55 is connected by linkage 56 or other means to release a valve 50 to control its opening or closing.

The purpose of this release valve is to prevent the lowering of the weight means unless the surface is below some reference level relative to the weight means such as reference level 57 in FIGS. 2 and 5. This level is sufficiently beneath the bottom of the weight means, or sufficiently close to it that buoyancy is negligible, that the body of water will not importantly impede the lowering of the weight means or reduce the weight which it exerts. A convenient control means comprises a float 58, a vertical shaft 59 and a plate 60 which will be moved to the uppermost position as shown in FIG. 2 by the water when it is as high as or higher than reference level 57. Bypass passages 61, 62 are provided to prevent liquid lock as shown.

When the float 58 is raised relative to the weight means, as shown in FIG. 2, the linkage to the release valve closes the release valve. When the surface 13 of the water is below the reference level 57 the control changes to the condition of FIG. 5. As soon as it moves down sufficiently, the release valve will open and the weight means can lower.

This device therefore constitutes a means which will permit the pressurizing means to discharge liquid under pressure whenever the weight means is elevated and is substantially unsupported by the liquid beneath it regardless of the elevation of the surface relative to the bottom.

It is evident that other means can be mounted to the weight means such as a ballcock linkage, providing release valve 50 in the form of a ballcock valve responsive to the level of the water surface relative to the weight means.

FIG. 6 shows that the pressure source 10 can be enclosed in a tank-like enclosure 65 if desired having ports 66 to permit water to surge in and out in response to wave action at the surface. This will protect the device of FIG. 1 from excessive battering by the waves and in some environments is to be preferred.

FIG. 7 shows that the release valve can be controlled as a function of pressure in the chamber as well as by the external level of the liquid. This is because a unique pressure is developed in the chamber when the weight means is unsuppported by the water. At that time pressure through a signal line 70 is transmitted to a release valve 71 which is a pressure-actuated valve that is closed at pressures below the chamber pressure which is developed by unsupported weight means, and opened at that pressure. Of course the release pressure can be set at a level slightly below so as to be certain of operation. In all other respects this is the same of embodiment of FIGS. 1 and 2.

This invention thereby provides a means whereby small intermittent variations in wave motion can generate a uniquely developed pressure and over a wide range of elevations not necessarily associated with an elevation in a tank or container. Therefore this device broadens the advantages shown by the West patent because of the freedom from specific tank or environmental heights and levels.

This invention is not to be limited by the embodiments shown in the drawings and described in the description which are given by way of example and not of limitation but only in accordance with the scope of the appended claims.

I claim:

1. A pressure source to develop a stream of liquid under pressure as the consequence of the rise and fall of the surface of a body of water, comprising: pressurizing means comprising an enclosure which bounds a chamber, said enclosure comprising a first and a second portion, at least one of which portions is movable relative to the other as a consequence of a force applied to one of them so as to reduce the volume of the chamber and thereby to place under pressure liquid which is contained therein; a conduit leading from said chamber through which a stream of liquid under pressure can flow for doing work; buoyant weight means floatable in said body of water; force transmission means so disposed and arranged as to apply force from said weight means to said one portion when said weight means is elevated; an open-closed release valve in said conduit which when closed prevents flow of liquid from the chamber through the conduit and will thereby also prevent said weight means from lowering, and which when open permits flow of liquid under pressure from the chamber through the conduit and will thereby permit said weight means to lower; and control means effective selectively to close and to open said release valve, said control means closing the release valve when the water surface is as high or higher than a reference level relative to the weight means itself, and opening the release valve means when lower, said control means comprising a buoyant float and inflexible mounting means, said mounting means being mounted to said weight means, said buoyant float being attached to said mounting means, said mounting means being so mounted to said weight means as movably to mount said buoyant float for movement relative to said weight means, which movement of said buoyant float means is independent of said weight means, but responsive to the elevation of said surface relative to said weight means, and only along a single unique and invariable path relative to said weight means, whereby the location of the buoyant float relative to the weight means, and the control condition of the control means are uniquely a function of the elevation of said surface relative to said weight means, said mounting means is a rigid shaft vertically shiftably mounted to said weight means, said shaft depends downwardly from the bottom of said weight means, and in which said control means controls said valve in such a manner that said buoyant float extends for a sufficient distance beneath the bottom of said weight means when it opens said valve that said surface of water is out of contact of said weight means.

* * * * *